United States Patent [19]
Ishida et al.

[11] Patent Number: 5,488,519
[45] Date of Patent: Jan. 30, 1996

[54] RECORDING AND REPRODUCING DEVICE HAVING CONDUCTIVE SPINDLE

[75] Inventors: Takehisa Ishida, Tokyo; Hiroshi Takino, Kanagawa, both of Japan

[73] Assignee: Sony Corporation, Japan

[21] Appl. No.: 468,634

[22] Filed: Jun. 6, 1995

Related U.S. Application Data

[63] Continuation of Ser. No. 140,273, Oct. 19, 1993, abandoned, which is a continuation of Ser. No. 681,320, Apr. 4, 1991, abandoned.

[30] Foreign Application Priority Data

Apr. 6, 1990 [JP] Japan ......................................... 2-91618

[51] Int. Cl.$^6$ ............................... G11B 5/596; G11B 5/82; G11B 5/09
[52] U.S. Cl. ..................... 360/77.03; 360/51; 360/77.11; 360/135
[58] Field of Search ............................. 360/77.08, 77.11, 360/77.01, 77.03, 77.04, 78.04, 78.11, 103, 104, 135, 51

[56] References Cited

U.S. PATENT DOCUMENTS

| | | | |
|---|---|---|---|
| 4,639,906 | 1/1987 | Goto | 360/77.03 |
| 4,701,815 | 10/1987 | Yada et al. | 360/77 |
| 4,729,048 | 3/1988 | Imakoshi et al. | 360/77.11 |
| 5,010,430 | 4/1991 | Yamada et al. | 360/77.08 |
| 5,138,511 | 4/1992 | Hoshimi et al. | 360/77.08 |

FOREIGN PATENT DOCUMENTS

| | | | |
|---|---|---|---|
| 0162349A2 | 11/1985 | European Pat. Off. | G11B 5/596 |
| 0222071A2 | 5/1987 | European Pat. Off. | G11B 5/596 |
| 0259039A2 | 3/1988 | European Pat. Off. | G11B 5/596 |
| 2046480A | 11/1980 | United Kingdom | G11B 9/06 |

*Primary Examiner*—Timothy P. Callahan
*Assistant Examiner*—Trong Phan
*Attorney, Agent, or Firm*—Limbach & Limbach; Charles P. Sammut

[57] ABSTRACT

A recording and reproducing device having electro-conductive layers corresponding to track patterns arranged on a recording medium. A slider member of a head is provided with at least a pair of electrodes for use in detecting an electrostatic capacitance. Tracking of the head is controlled by the electrodes.

6 Claims, 8 Drawing Sheets

(PRIOR ART)

RECORDING AND REPRODUCING DEVICE HAVING CONDUCTIVE SPINDLE

This is a continuation of application Ser. No. 08/140,273 filed on Oct. 19, 1993, now abandoned, which is a continuation of application Ser. No. 07/681,320, filed Apr. 4, 1991 (now abandoned).

BACKGROUND OF THE INVENTION

1. Field of the Invention

The present invention relates generally to a recording and reproducing devices and recording medium therefor.

2. Description of the Background Art

Figure 18:
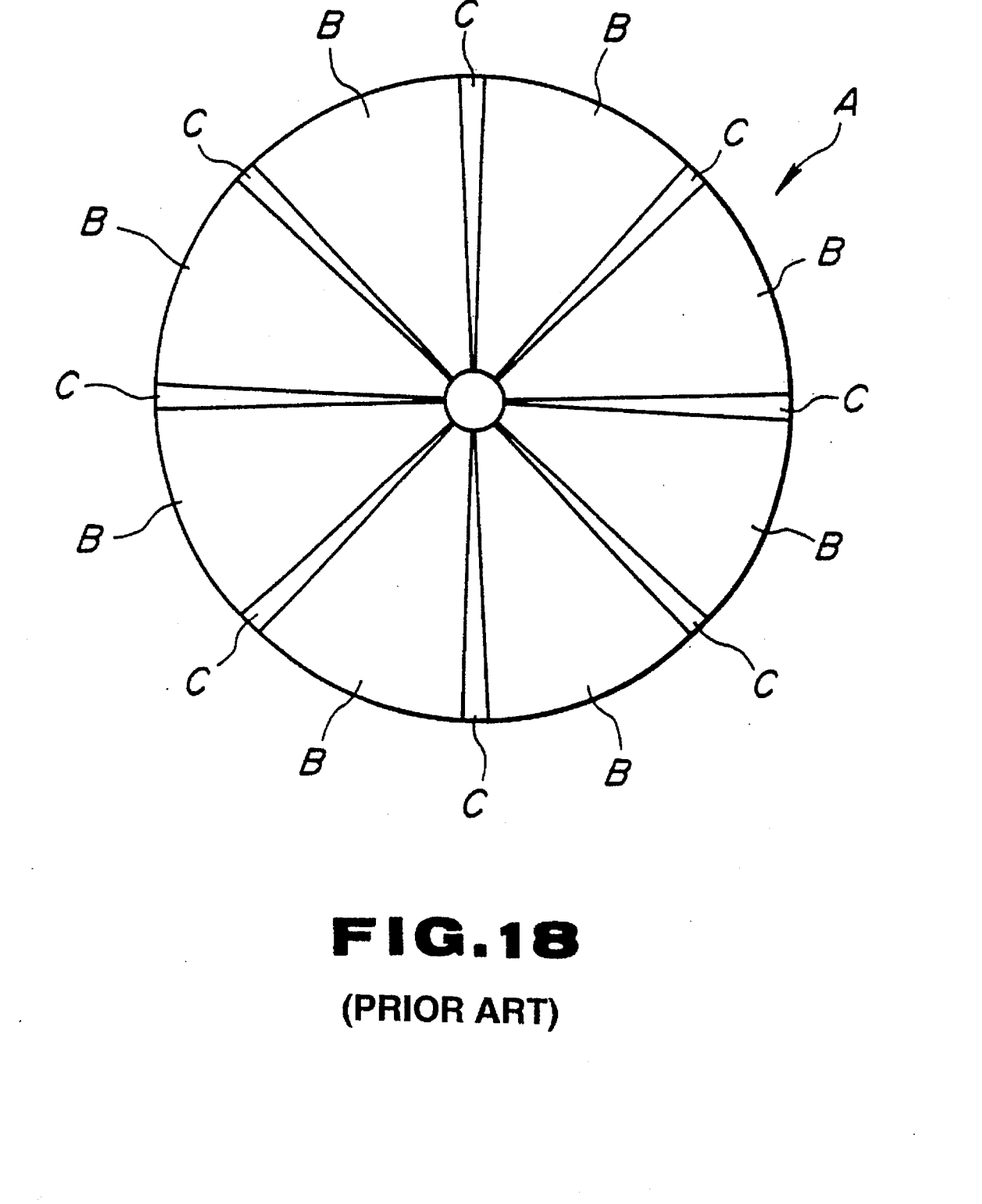
FIG. 18 is a top plan view for showing a conventional disc-type recording medium.

Referring to FIG. 18, as is well known, in the sector servo system for tracking in magnetic disk recording and reproducing, some servo sectors C, are arranged in a radial direction at data surfaces B of a disk type recording medium A. Information used for tracking is magnetically written in the servo sectors C.

However, aforesaid sector servo system has the following drawbacks.

Since the data surfaces B are provided with radial servo sectors C, a substantial data capacity at the data surface B is reduced. In order to improve an accuracy of head tracking, the number of servo sectors C must be increased, doing this to provide better tracking may compromise the high capacity of the data surfaces B.

Address information to be used for acknowledging at what track pattern the head is positioned is a servo of dispersed value located only at the servo sectors C, with the result that when the head is positioned between the two servo sectors C, by external disturbance, for example, a displacement in head position may not be corrected.

SUMMARY OF THE INVENTION

It is therefore a principal object of the present invention to provide a recording and reproducing device such as a magnetic disk recording and reproducing device for use in performing recording and/or reproducing operations by situating a head, opposing track patterns physically formed in advance on said recording medium, wherein an electrostatic capacitance is formed between the recording medium and a slider section of the head, the electrostatic capacitance is then detected resulting in that a high volume of the data and highly accurate tracking can be attained.

In order to accomplish the aforementioned and other objects, a recording and reproducing device comprises: a head, situated opposing track patterns which are physically formed in advance on a recording medium, the recording medium being provided with electrically conducting layers corresponding to the track patterns and a slider part of the head is provided with at least a pair of electrostatic capacitance detecting electrodes opposing aforesaid electrical conducting layer to as to control tracking of the head.

According to another aspect of the present invention, a recording and reproducing apparatus comprises: a recording medium having track patterns physically formed thereon in advance and further provided with an electrically conducting layer corresponding to the track patterns, an additional information pattern of an electrostatic capacitance type being arranged between the track patterns of the recording medium, a slider part of a read/write head associated with an apparatus for reading information from the recording medium being provided with at least a pair of electrostatic capacitance sensing electrodes opposing the electrically conducting layer of the recording medium so as to control tracking of the head and at the same time, the increased electrostatic capacitance of the additional information pattern is extracted as additional information.

According to yet another aspect of the present invention, a recording medium is provided on which track patterns are physically formed in advance and an electrostatic capacitance type information pattern is arranged between the track patterns.

Under an operative condition in which the head of the apparatus is oppositely faced against one of a plurality of track patterns in the recording medium to effect a recording or reproducing operation, an electrostatic capacitance generated between the pair of electrodes and the electrical conducting layers of the medium is detected, tracking error data corresponding to the detected capacitance is calculated, the tracking error data is then fed back to a drive circuit for an arm supporting the head and tracking of the head is controlled according to the fed back tracking error data such that the center of the head coincides with the center of the track patterns in real time.

BRIEF DESCRIPTION OF THE DRAWINGS

The present invention will be understood more fully from the detailed description given herebelow and from the accompanying drawings of the preferred embodiments of the invention. However, the drawings are not intended to imply limitation of the invention to a specific embodiment, but are for explanation and understanding only.

DESCRIPTION OF THE PREFERRED EMBODIMENT

Figure 1:
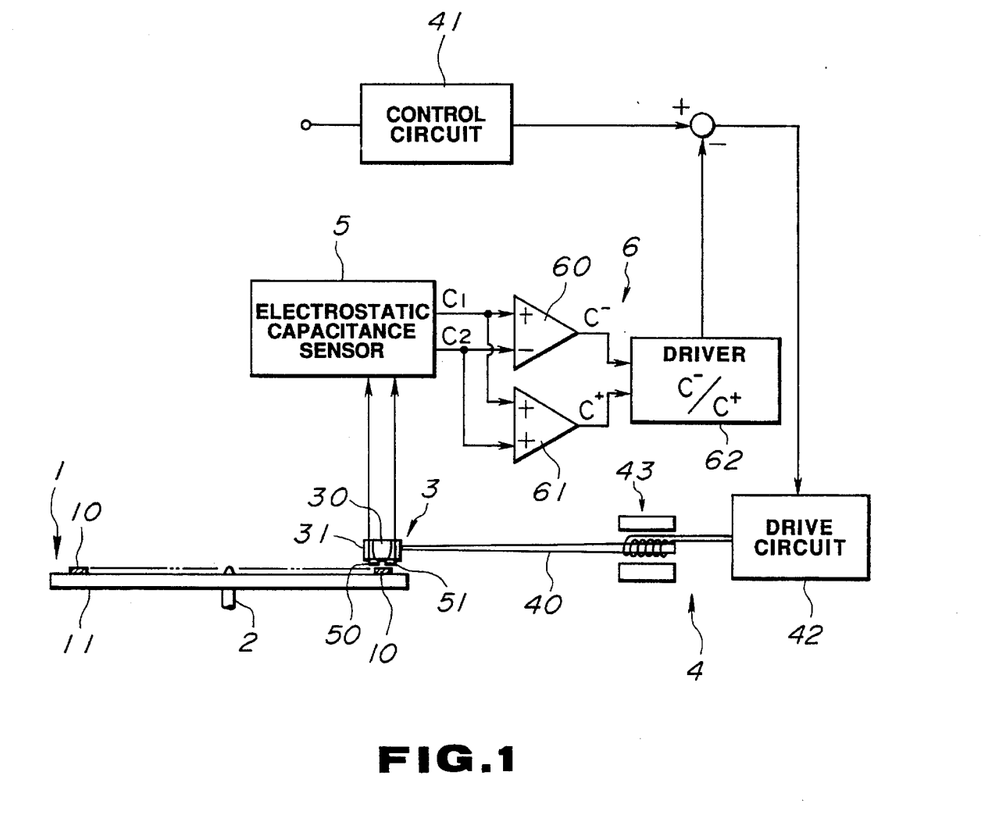
FIG. 1, is a configuration view for showing an entire constitution of the first preferred embodiment of the present invention.
Figure 2:
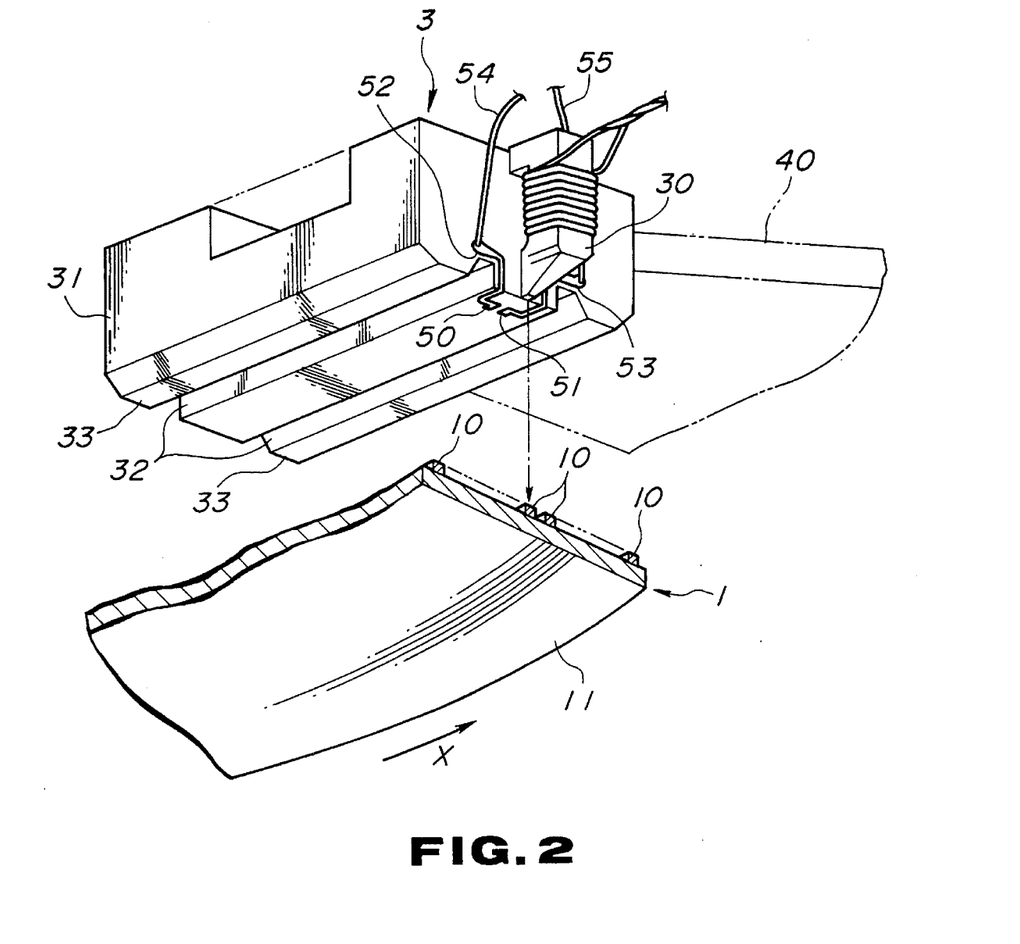
FIG. 2, is a perspective view for showing a head and a recording medium of the first preferred embodiment.
Figure 3:
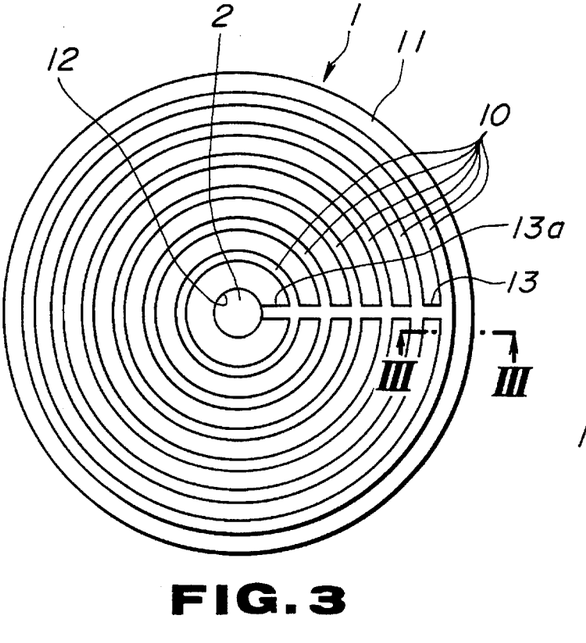
FIG. 3, is a top plan view for showing a recording medium of the first preferred embodiment.
Figure 4:
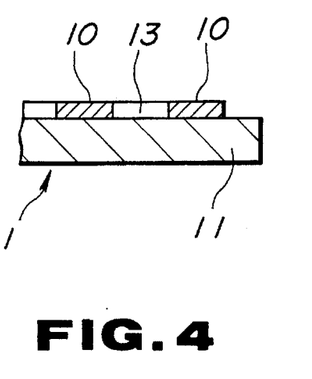
FIG. 4, is a sectional view taken along a line III—III of FIG. 3.

Referring now to the drawings, particularly to FIGS. 1–6, FIG. 1 shows a magnetic disk recording and reproducing device, wherein a recording medium 1 is installed at a spindle 2 and in turn a head 3 is fixed to an extreme end of a supporting arm 40 of a head driving means 4. A control circuit 41 may output a track position instruction to a drive circuit 42 in response to the track moving information, the drive circuit 42 may supply an electrical power corresponding to the track position instruction to a voice coil motor 43 so as to move the supporting arm 40. The head 3 is moved on the recording medium 1 through an operation of the supporting arm 40 and a head element 30 of the head 3 may oppose against one of a plurality of track patterns, physically formed in advance, in the recording medium 1. in turn, if the spindle 2 is rotationally driven with a motor not shown, the recording medium 1 is rotated in a circumferential direction (a direction indicated by an arrow in FIG. 2) of the spindle 2. As shown in FIG. 2, the head 3 is floated from the recording medium 1 through a dynamic pressure produced by two grooves formed at the lower surface of the slider part 31 of the head 3, floating surfaces 33 positioned outside the two grooves and a viscosity of air through a rotation of the recording medium 1. Data is magnetically recorded in the track patterns 10 to which the head element 30 opposes or the data magnetically recorded in the track patterns 10 is reproduced.

As shown in FIG. 1, the magnetic disc recording and reproducing device of the first preferred embodiment is constructed such that the recording medium 1 is provided with electrical conducting layers corresponding to the track patterns 10 and in turn the slider part 31 of the head 3 is provided with at least a pair of electrodes 50 and 51 opposing to the electrical conducting layers of the electrostatic capacitance sensor 5. Electrostatic capacitances $C_1$ and $C_2$ generated between the pair of electrodes 50 and 51 and the electrical conducting layers are detected by the electrostatic capacitance sensor 5. A tracking error ($e_t$) corresponding to the sensed electrostatic capacitances $C_1$ and $C_2$ is calculated by a calculation means 6. The tracking error ($e_t$) of the result of calculation is fed back to the drive circuit 42 and the tracking of the head 3 is controlled.

More practically, the electrical conducting layers are constructed by a physical method that, as shown in FIGS. 1 to 4, a plurality of track patterns 10 of different concentric diameters around the fixing hole 12 for the spindle 2 and a contact pattern 13 connecting these track patterns 10 to each other are closely vapor deposited on an entire upper surface of the main body 11 of the disc of the recording medium 1 of glass with layer of magnetic substance having an electrical conduction through a sputtering process, thereafter a resist patterns is formed on the magnetic layer through a photolithography process, a non-required part of the magnetic layer is etched with the resist pattern being applied as a mask and then the resist pattern is removed. An extended part 13a of the contact pattern 13 extending from the innermost track pattern 10 to the fixing hole 12 is contacted with the spindle 2 by installing the recording medium 1 on the spindle 2 of the track pattern 10 show an earth potential.

Figure 5:
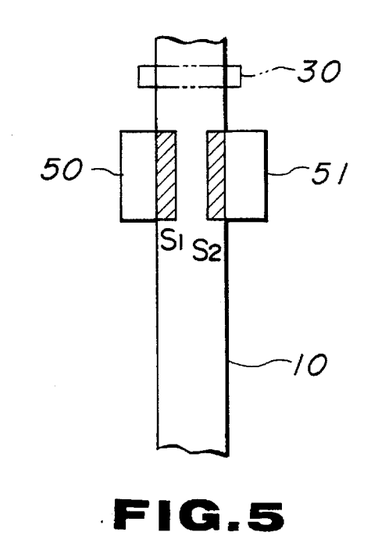
FIGS. 5 and 6, are illustrative views for showing an action and effect of the first preferred embodiment of the invention.

As shown in FIGS. 1 and 2, the pair of electrodes 50 and 51 are formed situated the side surface of the recording medium by the slider part 31 of the head 3 in such a way as they may oppositely face both side portions in a diametral direction of one track pattern of the plurality of track patterns 10 opposing against the head element 30. That is, as shown in FIG. 5, under a condition in which the head element 30 oppositely faces against one track pattern 10 while its center is being coincided with a center of one track pattern 10 in its diametral direction, the opposing areas $S_1$ and $S_2$ of the pair of electrodes 50 and 51 are extended from the recording medium surface of the slider part 31 to the side surface of the head element at both sides of the head element 30. Each of the lead patterns 52 and 53 is connected to the input terminal of the electrostatic capacitance sensor 5 shown in FIG. 1 through flexible lead lines 54 and 55, respectively.

As shown in FIG. 1, the calculation means 6 is provided with a subtractor 60 for calculating a pair of electrostatic capacitances $C_1$ and $C_2$ of outputs of the electrostatic sensor 5, an adder 61 for calculating a sum/$C^+$ of the pair of electrostatic capacitances $C_1$ and $C_2$ and a divider 62 for calculating a tracking error $e_t = C^-/C^+$ as a quotient in which the difference $C^-$ is divided by the sum $C^+$, and then the tracking error $e_t$ corresponding to the electrostatic capacitances $C_1$ and $C_2$ is calculated as a geometrical mean of the electrostatic capacitances $C_1$ and $C_2$.

Figure 6:
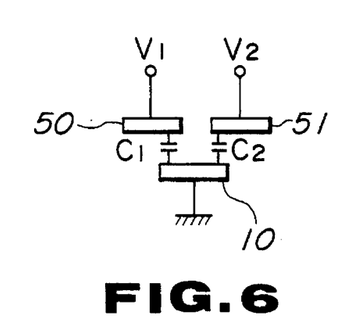

According to the configuration of the first preferred embodiment, the recording medium 1 is installed on the spindle 2, thereby a plurality of track patterns 10 become an earth potential through the contact pattern 13. Driving of the spindle 2 and input of track moving information to the control circuit 41 cause the head 3 to be floated on the recording medium 1 under an operative condition in which the head element 30 oppositely faces against one of a plurality of track patterns 10 in the recording medium 1, as shown in FIGS. 5 and 6, a pair of electrodes 50 and 51 oppositely face against one track pattern 10. As indicated in the following equations 1 and 2, between the opposing pair of electrodes 50 and 51 and one track pattern 10, are generated the electrostatic capacitances $C_1$ and $C_2$ corresponding to the opposing areas $S_1$ and $S_2$.

$$C_1 = \frac{\epsilon \cdot S_1}{d} \quad (1)$$

$$C_2 = \frac{\epsilon \cdot S_2}{d} \quad (2)$$

where, d is an amount of floating operation and $\epsilon$ is a dielectric constant of air.

The electrostatic capacitance sensor 5 detects electrostatic capacitances $C_1$ and $C_2$ generated between the pair of electrodes 50 and 51 and one track pattern 10, and the calculation means 6 composed of the subtractor 60, adder 61 and divider 62 may calculate the tracking error $e_t$ corresponding to the detected electrostatic capacitances $C_1$ and $C_2$. The tracking error $e_t$ calculated by the calculation means 6 becomes as follows in reference to the equations (1) and (2).

$$e_t = \frac{C_1 - C_2}{C_1 + C_2} \quad (3)$$

$$= \frac{\epsilon/d(S_1 - S_2)}{\epsilon/d(S_1 + S_2)}$$

$$= \cdot \frac{S_1 - S_2}{S_1 + S_2}$$

As apparent from this equation (3), the electrostatic capacitances $C_1$ and $C_2$ are detected to calculate the tracking error $e_t$ not influenced by variation of the floating amount d, this calculated tracking error $e_t$ is fed back from the calculation means 6 to the drive circuit 42. The drive circuit may supply an electrical power added with the tracking error $e_t$ got from the calculation means 6 to the track position instruction from the control circuit 41 to the voice coil motor 43, thereby the operating arm 40 may operate to cause the electrostatic capacitances $C_1$ and $C_2$ to be equal in real time. That is under a condition in which the head element 30 oppositely faces one track pattern 10 while its center is being coincided with a radial center of one track pattern 10, it is constructed such that the opposing areas $S_1$ and $S_2$ of the pair of electrodes 50, 51 and one track pattern 10 are make equal to each other, so that the tracking error $e_t$ is fed back from the calculation means 6 to the drive circuit 42, and the head 3 is controlled for its tracking in such a way that a center of the head element 30 is coincided with a center of the track pattern 10 in real time.

Figure 7:
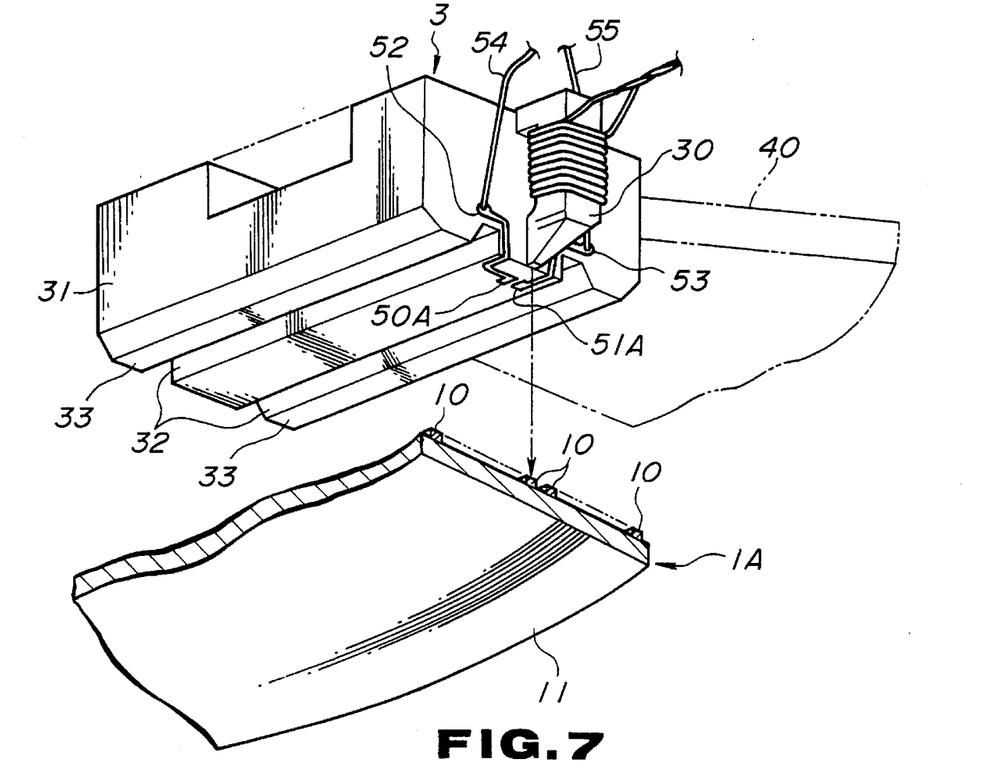
FIG. 7, is a perspective view for showing the head and the recording medium of the second preferred embodiment of the present invention.
Figure 8:
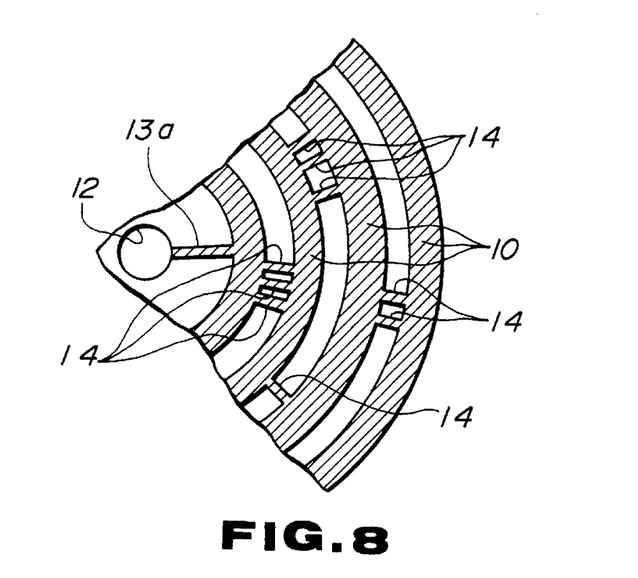
FIG. 8, is a top plan view for showing a part of the recording medium of the second preferred embodiment of the present invention.
Figure 9:
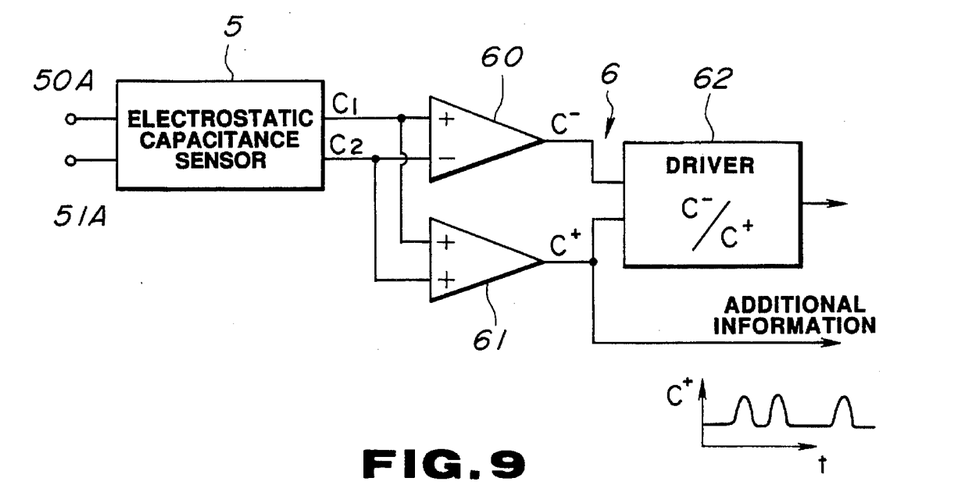
FIG. 9, is a view of configuration for showing a substantial part of the second preferred embodiment of the present invention.
Figure 10:
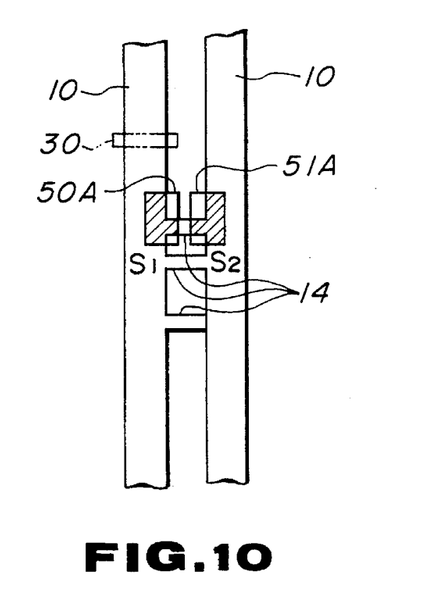
FIGS. 10 and 11, are illustrative views for showing an action in the second preferred embodiment.

A second preferred embodiment of the present invention is shown in FIGS. 7 to 11. A feature of the second preferred embodiment, as shown in FIG. 8, is that electrostatic capacitance type additional information patterns 14 are arranged between the track patterns 10 of the recording medium 1A. As shown in FIGS. 7 and 10, the track patterns 10 are physically formed by material having electrical conducting and magnetic characteristics so as to form the electrical conducting layers corresponding to the track patterns 10 are formed in the recording medium 1A, such that, under a condition in which the head element 30 is oppositely faced against one track pattern 10 while its center is being coincided with a radial center of one track pattern 10, a pair of electrodes 50A and 51A arranged in the slider part 31 may oppose the radial outer part of one track pattern and the radial inner part of its adjoining track pattern 10 and these opposing areas $S_1$ and $S_2$ are equal to each other, that as shown in FIG. 9, the sum $C^+$ calculated at the adder 61 is extracted as additional information.

Figure 11:
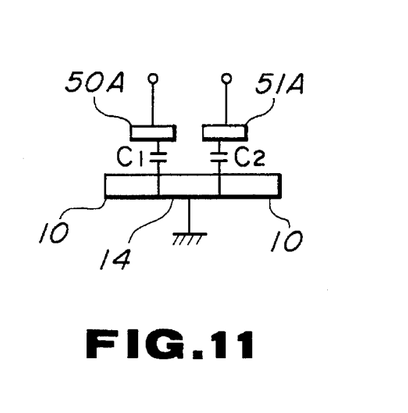

Accordingly, the structure of the second preferred embodiment shows that a plurality of track patterns 10 and the additional information patterns 14 as well as the extended part 13a are made of electrical conductive and magnetic material, so that installation of the recording medium 1A on the spindle 2, which spindle 2 is conductive, causes the plurality of track patterns 10 and the additional track patterns 14 to become the earth potential. Thus, as shown in FIGS. 10 and 11, under a condition in which the head element 30 is oppositely faced against one of the plurality of track patterns 10 of the recording medium 1A to enable a recording and/or reproducing operation to be performed, a pair of electrodes 50A and 51A oppositely face one track pattern 10 opposing against the head element 30 and its adjacent track pattern 10, respectively. The electrostatic capacitance sensor 5 may detect the electrostatic capacitances $C_1$ and $C_2$ generated between the pair of electrodes 50A and 51A and the two track patterns 10. The calculation means 6 may calculate the tracking error $e_t$ in response to the detected electrostatic capacitances $C_1$ and $C_2$ as follows;

$$e_t = \frac{C_1 - C_2}{C_1 + C_2} = \frac{S_1 - S_2}{S_1 + S_2}$$

The calculation result is fed back to the drive circuit 42 and then the tracking of the head 3 is controlled in such a way that the center of the head element 30 is coincided with the center of one track pattern 10. In cooperation with this controlling operation, in a case that the pair of electrodes 50A, 51A pass above the additional information patterns 14, the electrostatic capacitances $C_1$ and $C_2$ are increased by a corresponding area of the pair of electrodes 50A, 51A against the additional information patterns 14 so that, as shown in FIG. 9, the sum $C^+$ calculated by the adder 61 is increased in response to the additional information 14. Accordingly, the sum $C^+$ from the adder 61 is extracted as additional information, and this information can be utilized as an address information showing to what track pattern 10 the head element corresponds.

Figure 12:
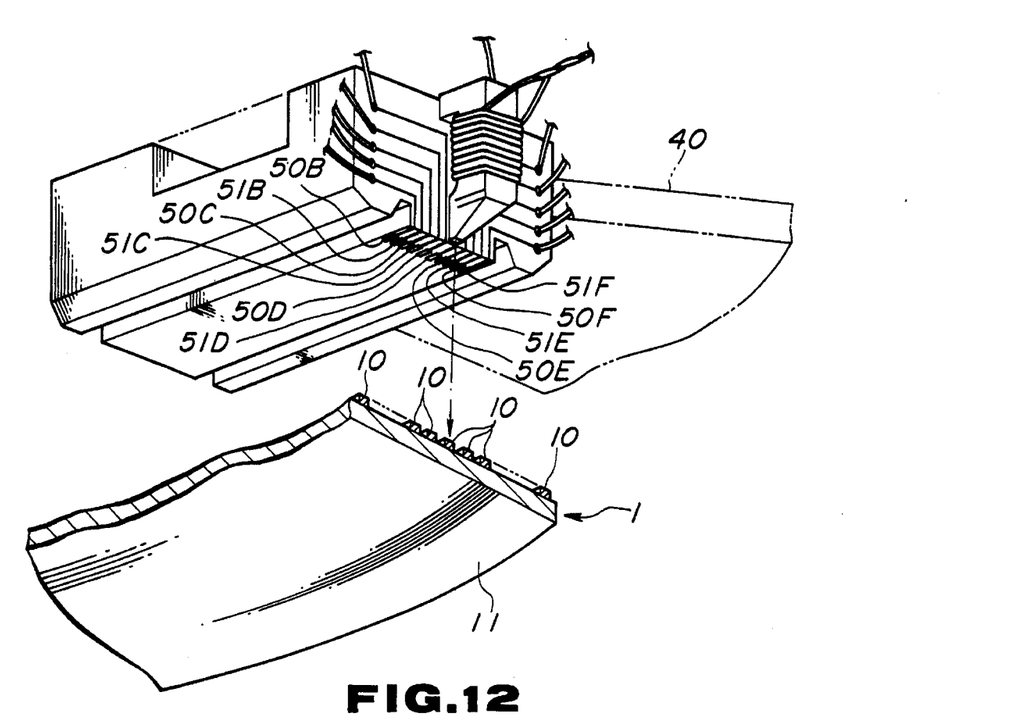
FIG. 12, is a perspective view for showing the head and the recording medium of the third preferred embodiment of the present invention.
Figure 13:
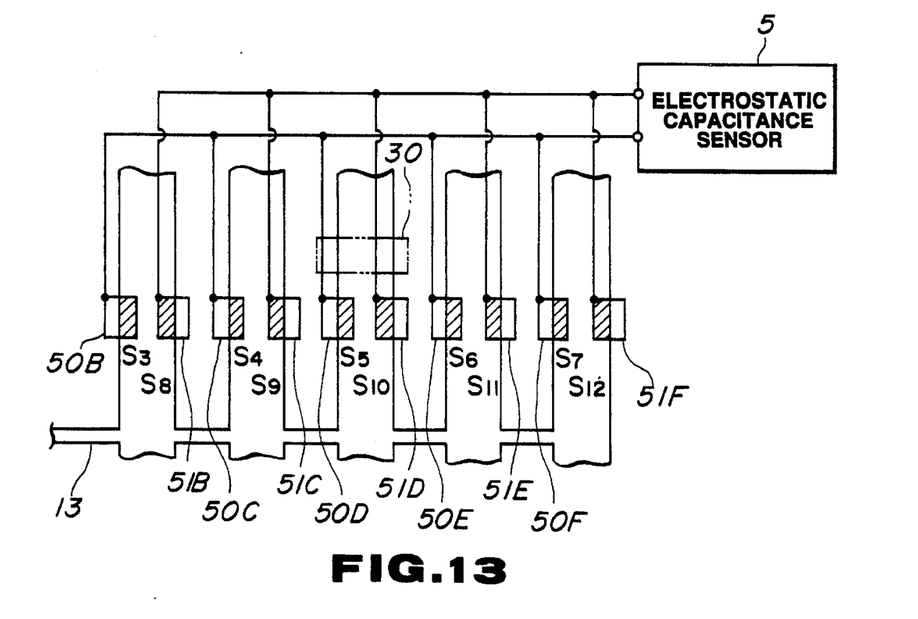
FIG. 13, is an illustrative view for showing an action of the third preferred embodiment.

FIGS. 12 and 13 show a third preferred embodiment according to the present invention. Features of the third embodiment include track patterns 10, physically formed or an electro-conductive and magnetic material to construct an electric conductive layer corresponding to the track patterns 10 in the recording medium 1. An even number of electrodes 50B, 50C, 50D, 50E, 50F, 51B, 51C, 51D, 51E, and 51F, numbering more than four are arranged at a side surface of the recording medium of the slider part 31, such that under a condition in which the head element 30 oppositely faces against one track pattern 10 with its center being coincided with a radial center of one track pattern 10, the electrodes 50B, 50C, 50D, 50E, 50F, 51B, 51C, 51D, 51E, and 51F are oppositely faced against four track patterns 10 adjacent to the electrodes and these opposing areas $S_3$, $S_4$, $S_5$, $S_6$, $S_7$, $S_8$, $S_9$, $S_{10}$, $S_{11}$, $S_{12}$ ($S_1 = S_3 + S_4 + S_5 + S_6 + S_7 + S_8 + S_9 + S_{10} + S_{11} + S_{12}$) become equal to each other, and the electrodes 50B, 50C, 50D, 50E, 50F, 51B, 51C, 51D, 51E, and 51F opposing one side of a radial direction of several track patterns 10 are connected in parallel at one input terminal of the electrostatic capacitance sensor 5, and several of the electrodes 51B, 51C, 51D, 51E and 51F opposing the other sides in the radial directions of several track patterns 10 are connected in parallel with the other input end of the electrostatic capacitance sensor 5.

Accordingly, the structure of the third preferred embodiment shows that several track patterns 10 and the contact patterns 13 are made of electrical conductive and magnetic material, so that installation of the recording medium 1 on the spindle 2 causes several track patterns to assume an earth potential. Accordingly, under a condition in which the head element 30 oppositely faces against one of several track patterns 10 or the recording medium 1 to enable a recording and/or reproducing operation to be performed, as shown in FIG. 13, an even number of electrodes 50B, 50C, 50D, 50E, 50F, 51B, 51C, 51D, 51E, and 51F oppositely face against one opposing track pattern 10 of the head element 30 and adjoining four track patterns 10, respectively and the electrostatic capacitance sensor 5 may detect the electrostatic capacitances $C_3$, $C_4$, $C_5$, $C_6$, $C_7$, $C_8$, $C_9$, $C_{10}$, $C_{11}$, $C_{12}$, ($C_1 = C_3 + C_4 + C_5 + C_6 + C_7$, $C_2 = C_8 + C_9 + C_{10} + C_{11} + C_{12}$) generated among the electrodes 50B, 50C, 50D, 50E, 50F, 51B, 51C, 51D, 51E, and 51F and the five track patterns 10 and then the calculation means 6 may calculate the tracking error as follows in response to the detected electrostatic capacitances $C_1$ and $C_2$.

$$e_t = \frac{C_1 - C_2}{C_1 + C_2} = \frac{S_1 - S_2}{S_1 + S_2}$$

The result of calculation is fed back to the drive circuit 42 and the tracking of the head 3 is controlled such that the center of the head element 30 is coincided with the center of one track pattern 10 in real time. In the third preferred embodiment, an even umber of electrodes more than four 50B, 50C, 50D, 50E, 5OF, 51B, 51C, 51D, 51E, and 51F are provided arranges into to equal sets and connected in parallel with the in/out terminal of the electrostatic capacitance sensor 5, so that, as compared with the first and second preferred embodiment, it may detect variation of the electrostatic capacitance of n-times when electrodes of 2.n in number are provided. Thus, even in a case that the floating amount (d) of the head 3 from the recording medium 1 is varied or one electrode is small in size or the like, a sufficient S/N can be assured.

The present invention however, is not limited to the aforesaid embodiments, as shown in FIG. 6, for example, assuming that the potential of the electrode 50 is defined as $V_1$, its electrical charge is $Q_1$, a potential of the electrode 51 is $V_2$ and its electrical charge is $Q_2$, voltages $V_1$ and $V_2$ may be defined as;

$$V_1 = \frac{Q_1}{C_1}$$

$$V_2 = \frac{Q_2}{C_2}$$

and further, assuming that $Q_1=Q_2$ is attained, the voltage $V_2$ becomes;

$$V_2 = \frac{C_1 V_1}{C_2}$$

and a ratio of $V_2:V_1$ becomes;

$$\frac{V_2}{V_1} = \frac{C_1}{C_2} \qquad (4)$$

Substituting the equation (4) with the equations (1) and (2) shows the following relation;

$$\frac{V_2}{V_1} = \frac{C_1}{C_2} = \frac{\frac{\epsilon}{d} S_1}{\frac{\epsilon}{d} S_2} = \frac{S_1}{S_2}$$

Accordingly, the potential $V_1$ the electrode 50 is kept constant to cause the potential $V_2$ of the electrode 51 to become an amount proportional to a ratio between the opposing area $S_1$ and the opposing area $S_2$. Then, the potential $V_1$ which corresponds to $C_1$ is kept constant and a varying amount of the potential $V_2$ corresponding to $C_2$ is applied as the tracking error $e_t$, thereby the calculation means 6 may be eliminated.

Figure 14:
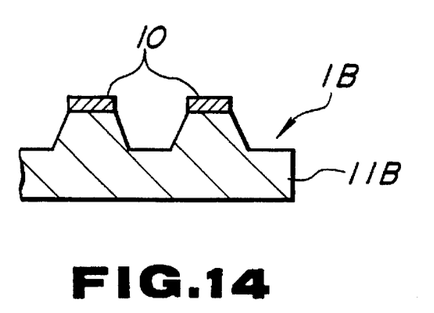
FIGS. 14, 15, 16 and 17 are partial sectional views for showing various examples of the recording medium of the present invention.
Figure 15:
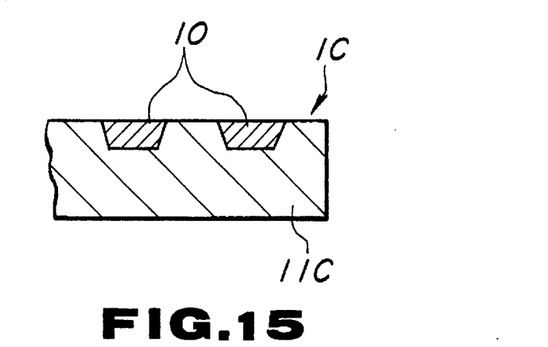
Figure 16:
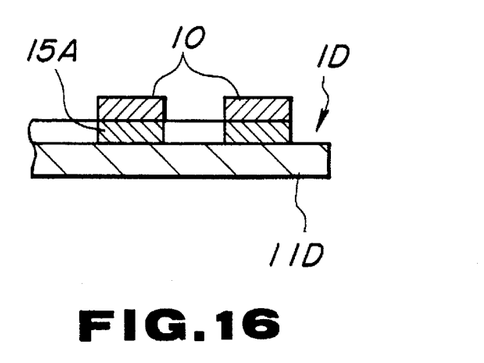
Figure 17:
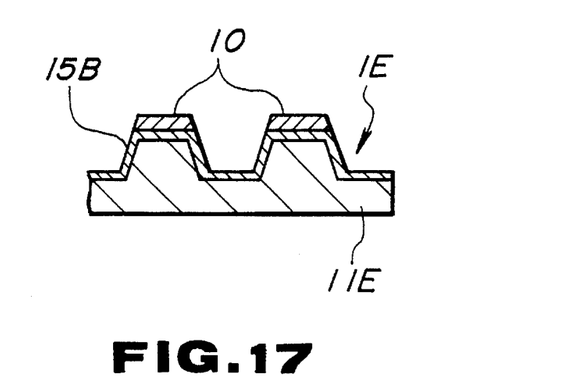

As shown in FIG. 14, it is possible that the recording medium 1B is formed with grooves, the track pattern 10 composed of electrical conducting and magnetic characteristics is formed on the upper surface of the groove of the disc main body 11B or as shown in FIG. 15, the track pattern 10 composed of electro-conducting and magnetic characteristics is buried flush with the upper surface of the disc main body 11C of the recording medium 1C, or as shown in FIGS. 16 and 17, the electrical conducting layer 15A or 15B is placed between the track pattern 10a of magnetic material and the disc main body 11D or 11E of the recording medium 1D or 1E and the contact pattern can be eliminated by forming the disc main body (not shown).

In addition, the present invention can be applied to opto-magnetic type disc recording and reproducing devices in which the head is an optical head.

As described above, according to the present invention, the head oppositely faces against one of several track patterns in the recording medium to enable a recording and/or reproducing operation to be carried out, wherein the electrostatic capacitances generated between the electrodes and the electrical conducting layers can be controlled in real time in response to a tracking error value corresponding to the detected electrostatic capacitances. In addition, in cooperation with tracking control of the head, an increased amount of the electrostatic capacitance in a case that the electrodes pass over the additional information patterns, this increased electrostatic capacitance can be extracted as additional information such as address information. Thus, highly accurate tracking, which can endure against a disturbance may be attained and, in addition, it is easily possible to accomplish recording or a high data capacity through effective utilization of surplus area in the recording medium and the narrow tracking possible according to the invention.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A recording and/or reproducing apparatus comprising:

head slider means having at least a pair of electrodes on a bottom surface thereof, said electrodes positioned opposite to concentric conductive magnetic stripes provided on a disc said concentric conductive magnetic stripes being provided with conductive bridge stripes between adjacent ones of said conductive stripe, the conductive bridge stripes for storing additional information;

head arm means for supporting said head slider means;

head drive means coupled to said head arm means for moving said head slider means by way of said head arm means;

means for detecting capacitances between said electrodes and said concentric conductive magnetic stripes;

tracking error signal detecting means connected to said capacitance detecting means for generating tracking error signals;

means for feeding back said tracking error signals to said head drive means;

conductive spindle means for rotating said disc; and at least one radial conductive stripe conductively connecting said concentric conductive magnetic stripes to said conductive spindle means.

2. A recording and/or reproducing apparatus of claim 1, wherein said tracking error signal detecting means further comprises:

adder means for adding capacitances between said electrodes and said concentric conductive stripes; subtractor means for subtracting capacitances between said electrodes and said concentric conductive stripes; and dividing means for determining a ratio of an output of said subtractor means and an output of said adder means.

3. A magnetic recording medium comprising:

a base disc;

concentric conductive magnetic tracks provided on said base disc, said concentric conductive magnetic tracks being provided with conductive bridge stripes between said concentric conductive magnetic tracks for storing additional information; add at least one radial conductive stripe extending from an innermost concentric conductive magnetic track to a fixing hole at the center of said base disc for establishing the potential of said concentric conductive magnetic tracks and said conductive bridge stripes.

4. A recording and reproducing device, comprising:

a head positioned opposite track patterns physically formed in advance in a recording medium;

concentric electro-conductive layers forming an additional information pattern of an electrostatic capacitance sensing type arranged between the track patterns of the recording medium;

a slider means of said head including at least a pair of electrodes for use in detecting an electrostatic capacitance to oppose said concentric electro-conductive layers an increased electrostatic capacitance caused by said additional information pattern being detected as additional data to control tracking of said head; and at least one radial conductive layer conductively extending from an innermost concentric electro-conductive layer to a fixing hole at the center of the recording medium.

5. A recording medium in which conductive magnetic track patterns are physically formed in advance, comprising:

electrostatic capacitive means arranged between the conductive magnetic track patterns on a disc shaped recording medium, said electrostatic capacitive means operative to store information; and at least one radial conductive layer extending from a fixing hole at the center of the recording medium, said radial conductive layer conductively connecting said conductive magnetic track patterns for establishing the potential of at least a portion of said conductive magnetic track patterns.

6. A magnetic recording medium comprising:

a base disc having concentric grooves;

conductive magnetic tracks provided within at least some of said grooves of said base disc said conductive magnetic tracks being provided with conductive bridge stripes between adjacent conductive magnetic tracks for storing additional information; and at least one radial conductive stripe extending from an innermost conductive magnetic track to a fixing hole at the center of said base disc for establishing the potential of said conductive magnetic tracks and said conductive bridge stripes.

* * * * *